United States Patent Office
3,551,468
Patented Dec. 29, 1970

3,551,468
STABILIZATION OF ORGANIC ISOCYANATES
David H. Chadwick, New Martinsville, W. Va., assignor to Mobay Chemical Company, Pittsburgh, Pa., a corporation of Delaware
No Drawing. Filed Mar. 22, 1966, Ser. No. 536,309
Int. Cl. C07c *119/04*
U.S. Cl. 260—453                               6 Claims

ABSTRACT OF THE DISCLOSURE

Organic isocyanates are stabilized with compounds having the formula $R_2C(OR')_2$ wherein R is a hydrogen atom or an organic radical and R' is an alkyl radical having from 1 to 18 carbon atoms or aralkyl.

This invention relates to organic isocyanates and more particularly to the stabilization of organic isocyanates against degradation and loss of their valuable properties.

Other isocyanates are reactive with a whole host of compounds through the highly unsaturated —N═C═O group and may even react with themselves. Their highly reactive character makes them difficult to store. The normally clear isocyanates tend to discolor and yellow and even turn a dark brown on storage. Furthermore, all isocyanates, even the solid ones are quite sensitive to moisture. The liquid organic isocyanates tend to become more viscous even in the absence of moisture or other reactive materials on storage in closed containers.

It has been proposed heretofore to employ various additives for the purpose of improving the storage characteristics of organic isocyanates. For example, it is proposed in U.S. Pat. 2,885,423 to use alkyl or aryl esters of carbonic acid for the purpose of stabilizing an organic isocyanate against discoloration. The esters of carbonic acid, such as diethyl carbonate, have essentially no effect on the stabilization of an organic isocyanate against a viscosity increase or against polymerization on storage. Many of these heretofore known additives are unsatisfactory for various reasons even though they may be effective for one desired purpose. Thus, some additives are highly toxic and have an obnoxious odor while others interfere with the subsequent use of the isocyanate for some use, for example, for the preparation of polyurethane foam where flame retardency, cell structure, cell stability and the like may suffer because of the nature of the additive.

It is therefore an object of this invention to provide stabilized organic isocyanates which are substantially free of the foregoing disadvantages. Still a further object of this invention is to provide an improved mixture of organic polyisocyanates which is stable to viscosity changes. Still another object of this invention is to provide organic isocyanates which are stable for long periods of time as to color and increases in viscosity.

The foregoing objects and others are accomplished in accordance with the invention, generally speaking, by providing organic isocyanates stabilized with a compound having the formula $R_2C(OR')_2$ wherein R is an organic radical and/or H and R' is alkyl of 1 to 18 carbon atoms or aralkyl. The stabilizer employed in the process of the present invention may be mixed with the organic isocyanate in any suitable proportion which is effective to stabilize the isocyanate against the deterioration desired. The unique feature of the present invention is that the compounds are capable of stabilizing the isocyanates against reaction with water in reasonable amounts. In severe tests where as much as 0.1% by weight of water is added to the stabilized isocyanate considerably less change in viscosity has been noted than in unstabilized samples. The loss of —NCO due to reaction with water in stabilized samples where no water is added is grossly less than that with the unstabilized sample.

Any suitable compound having the formula set forth above may be used including, for example, 2,2-dimethoxy propane, methylal, 1,1,3,3 - tetraethoxy propane, 2,2 - dibutoxy propane, 1,3,3 - trimethoxy propene and the like. Thus, in the formula above R may be any suitable organic radical and may contain additional oxygen linkages. For example one R in the foregoing formula may be a bis(beta-ethoxy) ethyl radical the other may be a hydrogen as in 1,3,3,3-tetraethoxy propane. In the case of 1,3,3-trimethoxy propene, one R group is hydrogen and the other R group is a 2-methoxy vinyl group, $CH_3OCH═CH—$, or the like.

While a wide variety of isocyanates can be stabilized in accordance with the method of the present invention, it is preferred to use the method of the present invention to stabilize liquid isocyanates. Suitable examples of isocyanates for stabilization according to the present invention include monoisocyanates as well as di- and higher polyisocyanates. Specific examples are alkyd and aryl isocyanates, such as phenyl isocyanate, para-chloro-phenyl isocyanate, meta-chlorophenyl isocyanates, alpha-naphthyl-isocyanate, ortho - dichlorophenyl isocyanate, methyl isocyanate, octadecyl isocyanate, ethyl isocyanate, n-propyl isocyanate, n-butyl isocyanate, orthochlorophenyl isocyanate, as well as diisocyanates such as meta-xylylene isocyanate, hexamethyl diisocyanate, toluidine diisocyanate, dianisidine diisocyanate, 4,4'-diphenyl methane diisocyanate, a mixture of 80% 2,4- and 20% 2.6 - toluylene diisocyanate, a mixture of 65% 2,4- and 35% 2,6 - toluylene diisocyanate, substantially pure 2,6-toluylene diisocyanate, biuret polyisocyanates such as the reaction product of 3 mols of hexamethylene diisocyanate with one mol of water as disclosed in U.S. Pat. 3,124,605, urethane polyisocyanates such as the reaction product of one mol of trimethylolpropane with three mols of a mixture of 80% 2,4-toluylene diisocyanate and 20% 2,6-toluylene diisocyanate and the like. As pointed out above, however, the preferred organic isocyanates to be stabilized in accordance with this invention are those liquid organic isocyanates or liquid mixtures of isocyanates, i.e. those which are liquid at temperatures above about 10° C. A preferred type, but not necessarily all suitable mixtures thereof, is disclosed in U.S. Pat. 2,683,730. In addition to the isocyanates disclosed in that patent, one may use similar isocyanates which contain a higher percentage of organic diisocyanate. These isocyanates may be referred to generally as polyphenyl polymethylene polyisocyanates. It is preferred to use those polyphenyl polymethylene polyisocyanates which contain from about 40 to about 70% of a diphenylmethane diisocyanate, preferably 4,4'-diphenylmethane diisocyanate and from about 15 to 40% triisocyanate having the formula

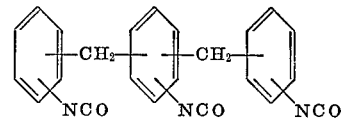

and the balance higher polyisocyanates. These isocyanates could be represented by the general formula

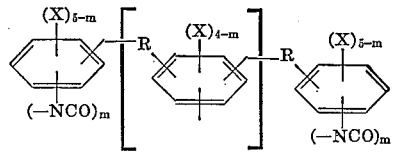

in which R is an organic radical and preferably an aliphatic radical obtained by removing the carbonyl oxygen for an aldehyde or ketone and is preferably —CH$_2$—, m is 1 or 2, X is halogen, lower alkyl or hydrogen and $n$ is 0, 1, 2 or 3. The aliphatic radical, R, in the foregoing formula may be obtained by removing the carbonyl oxygen from any suitable aldehyde or ketone such as, formaldehyde, acetaldehyde, propionaldehyde, butyraldehyde, N-heptaldehyde, benzaldehyde, cyclohexane, aldehyde, acetone, methyl ethyl ketone, methyl-n-propyl ketone, diethyl ketone, hexanon-2, hexanone-3, di-n-propyl ketone, di-n-heptyl ketone, benzophenone, dibenzyl ketone, cyclohexanone and the like. To illustrate, if one removes the carbonyl oxygen from formaldehyde, $H_2C=O$, the radical remaining is a methylene radical or from acetone, $CH_3—CO—CH_3$, the radical remaining is

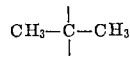

When X is halogen, it may be any suitable halogen, but is preferably chlorine or bromine; and further it is preferred that the amount of chlorine or bromine fall between about 1% and 15% by weight of the compound. When X is lower alkyl, it is most preferably methyl or ethyl but other lower alkyl radicals such as propyl, butyl and the like may be the radical, X. The polyaryl alkylene polyisocyanates of the invention are preferably mixtures of di- and higher polyisocyanates. Thus in the formula $n$ preferably has a value of from about 0.1 to about 1.5. To illustrate, in a mixture of isocyanates of the above formula containing 90% diisocyanate and 10% triisocyanate, $n$ would have a value of 0.1. For a mixture containing 20% di-, 30% tri-, 30% tetra- and 20% penta-isocyanate, the average value of $n$ would be 1.5. A most preferred value for $n$ is between about 0.85 and about 1.1 with about 40% to about 70% of the mixture of polyisocyanates being a diisocyanate.

Isocyanates of the above formula are well known and available commercially. They may be prepared as disclosed in U.S. Pat. 2,683,730. A specific isocyanate suitable for use in accordance with the present invention may be obtained by reacting about 60 parts of aniline with about 25 parts of formaldehyde (aqueous, 37% $CH_2O$) and about 74 parts of HCl (aqueous, 30% HCl) at a temperature of about 90° C. to about 100° C. for about 1.5 to about 2 hours and then reacting this product with NaOH and separating out the crude amine. About 100 parts of phosgene are then reacted with the resulting amine, the free excess phosgene and substantially all of the solvents used, if any, are then removed, until a product having an amine equivalent of about 135 and containing about 31% free —NCO is obtained.

A specific product of this type is obtained by phosgenating the reaction product of aniline with formaldehyde, said mixture of organic polyisocyanates having the formula

wherein $n$ has an average value of 0.88 and contains about 50% diisocyanate and about 21% trioscyanate, the balance being tetra- and penta-isocyanates sufficient to give $n$ a value of 0.88.

Still another type of product which is particularly adapted to use in accordance with the present invention is based on toluylene diisocyanates and the polyaryl polyalkylene polyisocyanates containing both diisocyanates and triisocyanates as set forth above. Any suitable mixture of toluylene diisocyanate and the polyaryl polyalkylene polyisocyanate may be used. It is desirable to use from 10 to 90% of toluylene diisocyanates and a particularly preferred mixture is one which contains at least 50% by weight of a polyphenyl polymethylene polyisocyanate and about 35 to 40% by weight toluylene diisocyanate which is preferably a mixture of about 80% 2,4- and 20% 2,6-toluylene diisocyanate.

In accordance with a preferred embodiment of the invention, the amount of iron in the composition is maintained below about 200 parts per million, preferably below about 100 parts per million in order to produce a mixture of polyphenyl polymethylene polyisocyanates which have very stable properties on storage and which in turn produce a foam when reacted with a polyol in the presence of a blowing agent which has good flame resistance and other good properties including dimensional stability and the like.

The compositions of the present invention are prepared by simply mixing the stabilizer with the organic isocyanate. The mixing may take place at any reasonable temperature preferably where the isocyanate is liquid as at room temperature. Standard handling procedures for isocyanates are adequate. The amount of stabilizer should be adjusted so that it is sufficient to prevent the undesired type of degradation and is preferably in the range of from about 0.001 to about 0.5 parts by weight based on the weight of the isocyanate.

The isocyanates of the present invention are useful where isocyanates have been used before, for example, for the preparation of polyurethane foam, nonporous plastics including castings such as gear wheels and the like; in addition they may be used to produce various coating compositions.

The invention is further illustrated by the following examples in which parts are by weight unless otherwise specified.

EXAMPLE 1

Samples of an isocyanate having the formula

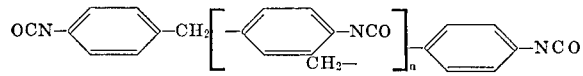

wherein $n$ has an average value of 0.88 and contains about 50% diisocyanate and about 21% triisocyanate, the balance being tetra- and penta-isocyanates sufficient to give $n$ a value of 0.88, are placed in glass screw cap bottles and the initial viscosity of the isocyanate is determined. Two identical samples are prepared for each stabilizer and for each separate amount of the same stabilizer tested. A sample is stored under substantially anhydrous conditions at about 45° C., and a second sample has about 0.1% by weight of water added and is then stored at 20° C. The viscosity of each sample is measured periodically and the average percent per week increase in viscosity is as shown in the following table:

| Additive | Weight percent added | Percent gained in viscosity/week at 45° C. | Percent gained with 0.1% water added at 20° C., after standing three days |
|---|---|---|---|
| None (control) | | 13.7 | 434 |
| 2,2-dimethoxy propane | 0.3 | 17.5 | 90 |
| Methylal¹ | 0.3 | 10.4 | |
| 1,1,3,3-tetraethoxy propane | 0.3 | 7.2 | |
| 2,2-dibutoxy propane | 0.3 | 16.8 | |
| 1,3,3-trimethoxy propene | 0.1 | 0.9 | 206 |
| Do | 0.3 | 0.9 | 47 |

Although the invention has been described in considerable detail in the foregoing, it is to be understood that such detail is solely for the purpose of illustration and that many variations can be made by those skilled in the art without departing from the spirit and scope of the invention.

What is claimed is:

1. An organic isocyanate stabilized against viscosity changes comprising a liquid organic isocyanate selected from the group consisting of alkyl and aryl isocyanates containing a stabilizing amount of a compound selected from the group consisting of 2,2-dimethoxy propane, methylal, 1,1,3,3-tetraethoxy propane, 2,2-dibutoxy propane, and 1,3,3-trimethoxy propene.

2. The organic isocyanate of claim 1 wherein said stabilizer is 1,3,3-trimethoxy propene.

3. The organic isocyanate of claim 1 wherein said isocyanate is a polyphenyl polymethylene polyisocyanate.

4. The organic isocyanate of claim 1 wherein said stabilizing compound is 2,2-dimethoxy propane.

5. The organic isocyanate of claim 1 wherein said stabilizing compound is 2,2-dimethoxy propane and said isocyanate is polyphenyl polymethylene polyisocyanate.

6. The organic isocyanate of claim 1 wherein said stabilizing compound is 1,3,3-trimethoxy propene and said isocyanate is a polyphenyl polymethylene polyisocyanate.

References Cited

UNITED STATES PATENTS

| | | | |
|---|---|---|---|
| 2,875,226 | 2/1959 | Bloom et al. | 260—453 |
| 2,885,420 | 5/1959 | Spiegler | 260—453 |

CHARLES B. PARKER, Primary Examiner

D. H. TORRENCE, Assistant Examiner

U.S. Cl. X.R.

260—2.5, 45.7, 75, 77.5